United States Patent Office 3,118,916
Patented Jan. 21, 1964

3,118,916
1,3-DIKETOSTEROIDS
Volkmar Goedicke, Berlin-Grunewald, Germany, assignor to Schering Aktiengesellschaft, Berlin, Germany
No Drawing. Filed July 3, 1962, Ser. No. 207,435
Claims priority, application Germany July 22, 1961
20 Claims. (Cl. 260—397.4)

The present invention relates to 1,3-diketosteroids, and more particularly to 1,3-diketones of the androstane series and to methods of introducing a 1-position keto group into the steroid framework of a compound of the androstane series.

It is an object of the present invention to provide new 1,3-diketosteroid compounds.

It is another object of the present invention to provide a method of producing 1,3-diketones of the androstane series.

It is another object of the present invention to provide new compounds having a strongly anti-estrogenic action.

Other objects and advantages of the present invention will be apparent from a further reading of the specification and of the appended claims.

With the above and other objects in view, the present invention mainly comprises as a new series of compounds 1,3-diketones of the androstane series.

In accordance with the method of the present invention $\Delta^1$-3-ketosteroids of the androstane series are first converted into the corresponding 1-hydroxy-2-halogen compound and then this halogen-hydrin compound by oxidation of the 1-hydroxy group and reductive elimination of the 2-position halogen (which steps can be carried out in either order) is converted into the 1,3-diketone of the androstane series.

The starting material can contain in addition to the directly concerned groups other groups which are inert to the reaction conditions. Non-inert groups, particularly additional hydroxyl groups, for example in the 17-position, can be protected in normal manner, for example by esterification, against undesired action of the oxidation agent. The ester residue can, if desired, be removed by subsequent known procedures.

The method of the present invention is illustrated by the following structural formula equations starting, for example, with $\Delta^1$-androstene-17$\beta$-ol-3-one-17-acetate:

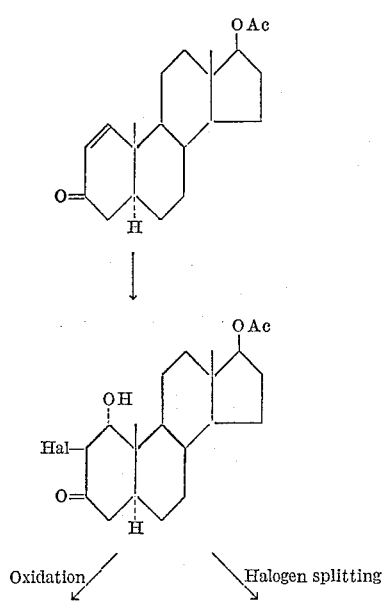

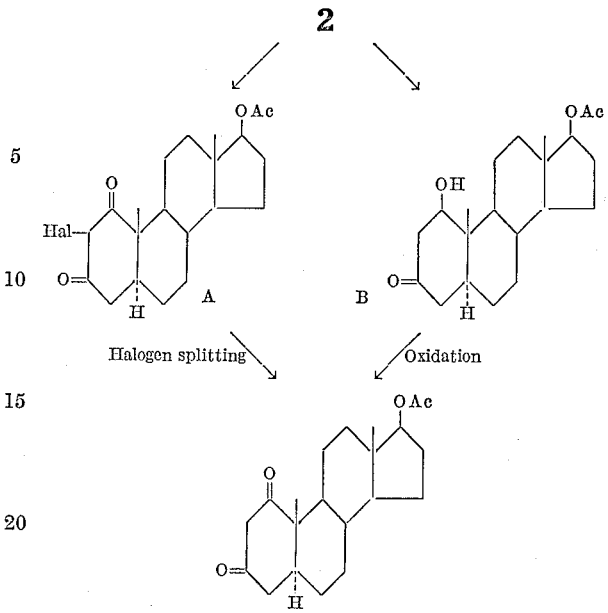

In the above equations Hal stands for halogen. If the halogen is chlorine then the reaction is preferably carried out in the order A, and if the halogen is bromine, then the reaction is preferably carried out in the order B.

The new compounds of the present invention are quite surprisingly extremely strongly anti-estrogenic in action. Thus it was observed in an anti-estrogen test carried out on castrated rats that after a single subcutaneous administration of 17$\beta$-hydroxy-androstane-1,3-dione-17-acetate seven days after administration of 25$\gamma$ of estradiol-undecylate in oily solution, permanent estrus was suppressible by 50% of the experimental animals in a dose as low as only 0.3 mg. Thus, the tested substance was about 13 times as strongly anti-estrogenic as progesterone.

In the anticyclus test on female rats, in which beginning with the last normal estrus following metestrus the test animals were subcutaneously injected for 10 days each day with a 0.3 mg. of the test substance, the compound 17$\beta$-hydroxyandrostane-1,3-dione-17-acetate was found to be about 10 times as strongly active as progesterone.

The following examples are given to further illustrate the present invention. The scope of the invention is not, however, meant to be limited to the specific details of the examples.

EXAMPLE 1

(a) 2$\beta$-Chloroandrostane-1$\alpha$,17$\beta$-Diol-3-One-17-Acetate 4.96 g. (15 mmols) of $\Delta^1$-androstene-17$\beta$-ol-3-one-17-acetate, [produced according to the method of Fajkos in Chemical Abstracts, 52, 4672 (1958)], are dissolved in 75 cc. of dioxane. There is added to the solution in the given sequence 7.5 cc. of water, 0.75 cc. of perchloric acid (78%) and 2.67 g. (20 mmols) of N-chlorosuccinimide. The reaction mixture is stirred at room temperature for 3 hours. The excess of hypochlorous acid is destroyed with 10% sodium sulfite solution. The reaction solution is stirred into 2 liters of ice water and filtered off under suction. The crude yield of 2$\beta$-chloroandrostane-1$\alpha$,17$\beta$,diol-3-one-17-acetate amounts to 5.5 g. (95.8%). After recrystallization from ether the amount obtained is 4.133 g. (72%) having a melting point of 204–206° C.

(b) 2$\beta$-Chloroandrostane-17$\beta$-Ol-1,3-Dione-17-Acetate 5.74 g. (15 mmols) of 2$\beta$-chloroandrostane-1$\alpha$,17$\beta$-diol-3-one-17-acetate are dissolved in 200 cc. of acetone and there is added thereto dropwise under stirring during a time period of 1 hour at a temperature of about 15° C. a chromosulfuric acid solution (produced from 1.3 g.=13 mmols of $CrO_3$ in 4 cc. of water and 1.5 cc. of concentrated sulfuric acid). The reaction mixture is further stirred for an additional hour. The excess of chromic acid is destroyed with 3 cc. of methanol. The reaction solution is stirred in 3 liters of ice water, the precipitate filtered off, dissolved in methylene chloride, washed with water, dried and concentrated under vacuum. The crude yield amounts to 5.3 g. (93%), which upon ultraviolet determination is found to contain about 70% of the 2β-chloro-1,3-diketone, namely the 2β-chloroandrostane-17β-ol-1,3-dione-17-acetate. After recrystallization from ethyl acetate there is obtained 3.5 g. (61%) of pure product having a melting point of 274–276° C.

(c) *Androstane-17β-Ol-1,3-Dione-17-Acetate*

380.9 mg. (1 mmol) of 2β-chloroandrostane-17β-ol-1,3-dione-17-acetate are suspended in 10 cc. of ethanol and 10 cc. of glacial acetic acid. After the addition of 500 mg. of zinc dust the reaction mixture is heated under refluxing for 2 hours. The reaction solution is stirred into ice water and extracted with ethyl acetate. The purified ethyl acetate extract is washed with water six times, dried and concentrated under vacuum, whereby there is obtained 300 mg. (90%) of the crude product. After recrystallization from acetone/hexane there is obtained 228 mg. (65.0%) of androstane-17β-ol-1,3-dione-17-acetate having a melting point of 210–212° C.

(d) *Androstane-17β-Ol-1,3-Dione*

200 mg. (0.577 mmol) of androstane-17β-ol-1,3-dione-17-acetate are heated under refluxing in 50 cc. of 5% methanolic potassium hydroxide for 1 hour. The reaction solution is cooled and stirred into ice cold 0.1 normal hydrochloric acid and extracted several times with ethyl acetate. The several extracts are washed with water and dried over sodium sulfate. The purified ethyl acetate extracts are then concentrated to dryness. The residue is recrystallized from acetone. There is thus obtained 152 mg. (85%) of androstane-17β-ol-1,3-dione having a melting point of 215/16–217° C.

EXAMPLE 2

(a) *2β-Bromoandrostane-1α,17β-Diol-3-One-17-Acetate*

A solution of 3.07 g. (9.3 mmol) of Δ¹-androstene-17β-ol-3-one-17-acetate [produced according to the method of Fajkos in Chemical Abstracts, 52, 4672 (1958)], in 90 cc. of dioxane, 9 cc. of water and 0.9 cc. of perchloric acid are during a course of 30 minutes reacted with 1.71 g. (12.4 mmols) of N-bromacetamide. After about 3 hours of stirring at room temperature and a subsequent reaction of the excess hypobromous acid with 10% aqueous sodium sulfite solution, the reaction mixture is stirred into about 3 liters of ice water. The thereby resulting precipitate is filtered off under suction and dissolved in ether. It is then washed with water, dried over sodium sulfate and the ether solution is filtered and then concentrated to dryness under vacuum. From the residue there is obtained after recrystallization from ether 2.63 g. (66%) of 2β-bromoandrostane-1α,17β-diol-3-one-17-acetate having a melting point of 176–178° C.

(b) *Androstane-1α,17β-Diol-3-One-17-Acetate*

20 g. of 2β-bromoandrostane-1α,17β-diol-3-one-17-acetate are dissolved in 400 cc. of a tetrahydrofurane-methanol mixture (1:1) and hydrogenated in the presence of 4 cc. of acetic acid, 5.8 g. of sodium acetate and 1.7 g. of Pd/CaCO₃ (5%). After taking up 1.05 mols of hydrogen the hydrogenation is stopped, the catalyst filtered off, the blank reaction solution (i.e. the clear filtrate) concentrated under vacuum to about 100 cc. and the remaining volume poured into water. The thus obtained precipitate is filtered off under suction after settling, washed and dried. The crude product (15.6 g.) is recrystallized from methanol or acetone/ether, whereby there is obtained 12.9 g. (79%) of androstane-1α,17β-diol-3-one-17-acetate having a melting point of 215–216° C. After recrystallization from ether the melting point increases to 231–234° C.

(c) *Androstane-17β-Ol-1,3-Dione-17-Acetate*

A solution of 1.05 g. (3 mmols) of androstane-1α,17β-diol-3-one-17-acetate and 150 cc. of acetone which contains about 1 cc. of ether is, under stirring and under nitrogen at a temperature of about 10° C., added dropwise to 1 cc. of chromic acid solution (consisting of about 0.27 g. of $CrO_3$, 0.23 cc. of concentrated $H_2SO_4$ and 0.5 cc. of water). The reaction solution is subsequently stirred for an additional 10 minutes. It is then precipitated with water, the acetone distilled off and the thus remaining precipitate filtered off under suction. After washing and drying the precipitate is recrystallized from methylene chloride/isopropyl ether. There is thus obtained a yield of 811 mg. (78%) androstane-17β-ol-1,3-dione-17-acetate having a melting point of 204–206° C.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed is new and desired to be secured by Letters Patent is:

1. A compound of the formula:

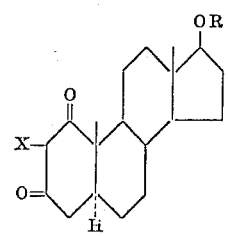

wherein R is selected from the group consisting of hydrogen and lower aliphatic carboxylic acid radicals; and wherein X is selected from the group consisting of hydrogen, bromine and chloride.

2. Androstane-17β-ol-1,3-dione.

3. Androstane - 17β - ol-1,3-dione-17-lower carboxylic acid ester.

4. Androstane-17β-ol-1,3-dione-17-acetate.

5. 2β-chloroandrostane-1α,17β-diol-3-one-17-lower carboxylic acid ester.

6. 2β-chloroandrostane-1α,17β-diol-3-one-17-acetate.

7. 2β-bromoandrostane-1α,17β-diol-3-one-17-lower carboxylic acid ester.

8. 2β-bromoandrostane-1α,17β-diol-3-one-17-acetate.

9. 2β - chloroandrostane-17β-ol-1,3-dione-17-lower carboxylic acid ester.

10. 2β-chloroandrostane-17β-ol-1,3-dione-17-acetate.

11. Androstane - 1α,17β-diol-3-one-17-lower carboxylic acid ester.

12. Androstane-1α,17β-diol-3-one-17-acetate.

13. The method of producing 1,3-diketones of the androstane series, which comprises converting a Δ¹-3-ketosteroid of the androstane series to the corresponding 1-hydroxy-2-halogen compound by reaction with a compound selected from the group consisting of N-chlorosuccinimide and N-bromoacetamide; oxidizing said 1-hydroxy-2-halogen compound by means of an oxidizing agent selected from the group consisting of chromic acid and chromosulfuric acid so as to form the corresponding 1-keto-2-halogen compound; and reductively eliminating the 2-position halogen by reduction by means of a reducing agent selected from the group consisting of zinc and hydrogen in the presence of a palladium catalyst, thereby forming the corresponding 1,3-diketosteroid of the androstane series.

14. The method of producing 1,3-diketones of the androstane series, which comprises converting a $\Delta^1$-3-ketosteroid of the androstane series to the corresponding 1-hydroxy-2-halogen compound by reaction with a compound selected from the group consisting of N-chlorosuccinimide and N-bromoacetamide; reductively eliminating the 2-position halogen by reduction by means of a reducing agent selected from the group consisting of zinc and hydrogen in the presence of a palladium catalyst, thereby forming the corresponding 1-hydroxy compound; and oxidizing said 1-hydroxy compound by means of an oxidizing agent selected from the group consisting of chromic acid and chromosulfuric acid so as to form the corresponding 1-keto compound, thereby obtaining a 1,3-diketosteroid of the androstane series.

15. The method of producing 1,3-diketones of the androstane series, which comprises converting a $\Delta^1$-3-ketosteroid of the androstane series to the corresponding 1-hydroxy-2-chloro compound by means of n-chlorosuccinimide; oxidizing said 1-hydroxy-2-chloro compound by means of an oxidizing agent selected from the group consisting of chromic acid and chromosulfuric acid so as to form the corresponding 1-keto-2-chloro compound; and reductively eliminating the 2-position chlorine by reduction by means of a reducing agent selected from the group consisting of zinc and hydrogen in the presence of a palladium catalyst, thereby forming the corresponding 1,3-diketosteroid of the androstane series.

16. The method of producing 1,3-diketones of the androstane series, which comprises converting a $\Delta^1$-3-ketosteroid of the androstane series to the corresponding 1-hydroxy-2-bromo compound by means of n-bromoacetamide; reductively eliminating the 2-position bromine by reduction by means of a reducing agent selected from the group consisting of zinc and hydrogen in the presence of a palladium catalyst, thereby forming the corresponding 1-hydroxy compound; and oxidizing said 1-hydroxy compound by means of an oxidizing agent selected from the group consisting of chromic acid and chromosulfuric acid so as to form the corresponding 1-keto compound, thereby obtaining a 1,3-diketosteroid of the androstane series.

17. The method of producing 1,3-diketones of the androstane series, which comprises converting a 17-lower carboxylic acid ester of $\Delta^1$-androstene-17$\beta$-ol-3-one to the corresponding 1-hydroxy-2-halogen compound by reaction with a compound selected from the group consisting of N-chlorosuccinimide and N-bromoacetamide; oxidizing said 1-hydroxy-2-halogen compound by means of an oxidizing agent selected from the group consisting of chromic acid and chromosulfuric acid so as to form the corresponding 1-keto-2-halogen compound; and reductively eliminating the 2-position halogen by reduction by means of a reducing agent selected from the group consisting of zinc and hydrogen in the presence of a palladium catalyst, thereby forming the corresponding 1,3-diketosteroid of the androstane series.

18. The method of producing 1,3-diketones of the androstane series, which comprises converting a 17-lower carboxylic acid ester of $\Delta^1$-androstene-17$\beta$-ol-3-one to the corresponding 1-hydroxy-2-halogen compound by reaction with a compound selected from the group consisting of N-chlorosuccinimide and N-bromoacetamide; reductively eliminating the 2-position halogen by reduction by means of a reducing agent selected from the group consisting of zinc and hydrogen in the presence of a palladium catalyst, thereby forming the corresponding 1-hydroxy compound; and oxidizing said 1-hydroxy compound by means of an oxidizing agent selected from the group consisting of chromic acid and chromosulfuric acid so as to form the corresponding 1-keto compound, thereby obtaining a 1,3-diketosteroid of the androstane series.

19. The method of producing 1,3-diketones of the androstane series, which comprises converting the 17-acetate of $\Delta^1$-androstene-17$\beta$-ol-3-one to the corresponding 1-hydroxy-2-halogen compound by reaction with a compound selected from the group consisting of N-chlorosuccinimide and N-bromoacetamide; oxidizing said 1-hydroxy-2-halogen compound by means of an oxidizing agent selected from the group consisting of chromic acid and chromosulfuric acid so as to form the corresponding 1-keto-2-halogen compound; and reductively eliminating the 2-position halogen by reduction by means of a reducing agent selected from the group consisting of zinc and hydrogen in the presence of a palladium catalyst, thereby forming the corresponding 1,3-diketosteroid of the androstane series.

20. The method of producing 1,3-diketones of the androstane series, which comprises converting the 17-acetate of $\Delta^1$-androstene-17$\beta$-ol-3-one to the corresponding 1-hydroxy-2-halogen compound by reaction with a compound selected from the group consisting of N-chlorosuccinimide and N-bromoacetamide; reductively eliminating the 2-position halogen by reduction by means of a reducing agent selected from the group consisting of zinc and hydrogen in the presence of a palladium catalyst, thereby forming the corresponding 1-hydroxy compound; and oxidizing said 1-hydroxy compound by means of an oxidizing agent selected from the group consisting of chromic acid and chromosulfuric acid so as to form the corresponding 1-keto compound, thereby obtaining a 1,3-diketosteroid of the androstane series.

No references cited.